A. Jameson.
Making Metal Tools.
N° 65,676. Patented Jan. 11, 1867.

United States Patent Office.

ABIEZER JAMESON, OF TRENTON, NEW JERSEY, ASSIGNOR TO HIMSELF, T. S. MURRAY, AND J. H. MURRAY, OF THE SAME PLACE.

Letters Patent No. 65,676, dated June 11, 1867.

IMPROVED SCREW-BOX FOR VISES.

*The Schedule referred to in these Letters Patent and making part of the same.*

TO ALL WHOM IT MAY CONCERN:

Be it known that I, ABIEZER JAMESON, of Trenton, Mercer county, New Jersey, have invented an improvement in the Manufacture of Screw-Boxes for Vises; and I do hereby declare the following to be a full, clear, and exact description of the same, reference being had to the accompanying drawing, and to the letters of reference marked thereon.

My invention consists of a mode, substantially as described hereafter, of manufacturing screw-boxes for vises, whereby a superior box is produced in less time, and with less labor and expense, than is required in making the boxes by the ordinary process.

In order to enable others skilled in the art to practise my invention, I will now proceed to describe the manner of carrying it into effect, reference being had to the accompanying drawing, which forms a part of this specification, and in which—

Figure 1:
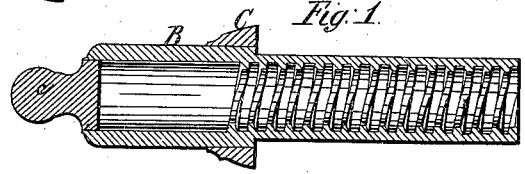

Figure 1 is a longitudinal section of a screw-box for vises constructed according to my improvement.

Figure 2:
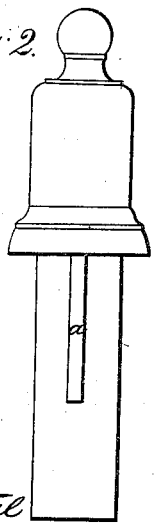

Figure 2, an exterior view.

Figures 3 to 6 inclusive are diagrams illustrating the manner in which the screw-box is made; and Figures 7 to 12 inclusive, diagrams illustrating the usual manner of making screw-boxes.

In order that the nature of my improvement may be better understood, I will first describe the manner in which screw-boxes for vises have heretofore been made.

Figure 7:
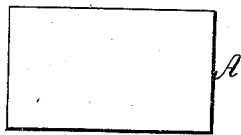
Figure 8:
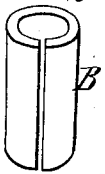
Figure 9:
Figure 10:
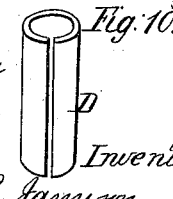
Figure 12:
Figure 11:
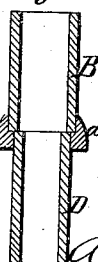

A flat sheet of iron, A, fig. 7, of the proper thickness and size, is heated, and bent to the form of a split tube, B, fig. 8, the edges of which, after the tube is again heated, are welded together. A short bar of iron is now bent so as to form a split ring, C, fig. 9, which is passed, for about half its width, on to the lower end of the tube B, and is then welded to the tube so as to form a continuous flange, $a$, as shown in fig. 11. A second plate is now bent and welded so as to form a tube, D, which is smaller in diameter than the tube B, and which, after its end is passed into the flange $a$, fig. 11, is heated and welded to the flange and tube B. A narrow strip, $a$, forming a "feather," is then welded to the exterior surface of the tube D. A thread is now cut in the interior of the tube, after which a block, E, is introduced into and welded in the end of the tube B. The box thus roughly formed is then turned in a lathe to the proper external shape and dimensions.

As these operations are performed by hand, the manufacture of the boxes is tedious and expensive; the different boxes are irregular in form and dimensions; the welds are often defective, especially at the point where the two tubes B D are connected, while, during the repeated heatings to which the box is subjected, the metal is so frequently burnt that the box will crack, or the screw-threads in the tube D will break away on the application of but a slight pressure.

Figure 3:
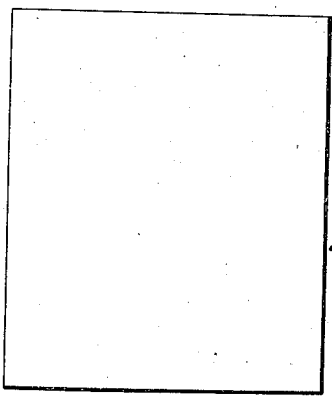
Figure 4:
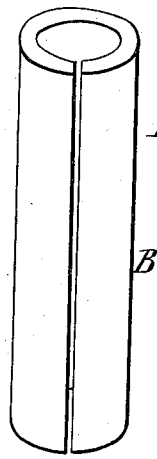
Figure 5:
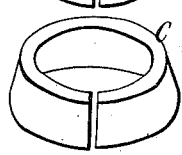
Figure 6:
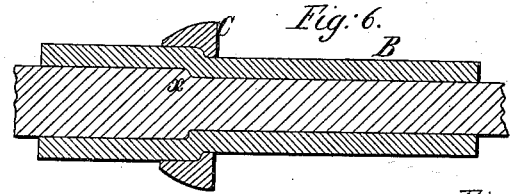

In order to overcome these difficulties, I construct the boxes in the following manner:

A sheet of metal, A, fig. 3, equal in length to the length of the box to be made, is first heated, and bent so as to form a split tube, B, after which a bar is bent into a ring, C, and is placed on the tube about midway between the ends of the same. The tube and its rings are brought to a welding heat, and a former, X, reduced in diameter at one end, is introduced into the tube, the shoulder $x$ of the former being about midway between the edges of the ring B, as shown in fig. 6. The tube is now compressed between dies of such a shape that, while the edges of the tube are welded together, and the ring welded to the tube, the lower portion of the tube will also be compressed on to the smaller end of the former X, and will thus be reduced in diameter, as shown in fig. 6. The former X is now withdrawn, and a strip, $a$, to form the "feather," is welded to the smaller portion of the tube. The thread is cut in the usual manner. A block, $c$, is welded in the larger end of the tube, and the latter is turned to the proper external size and shape. As the box is formed from a continuous sheet of metal the necessity of repeated heatings and weldings required to secure together the different parts in making the boxes by the usual process is avoided. The metal is not burned, and the boxes are stronger, while, by the use of dies, the expense and labor are greatly reduced, and the boxes produced are of uniform size and shape.

I claim as my invention, and desire to secure by Letters Patent—

The method, substantially as above described, of making screw-boxes for vises.

In testimony whereof I have signed my name to this specification in the presence of two subscribing witnesses.

ABIEZER JAMESON.

Witnesses:
CHARLES E. FOSTER,
JOHN WHITE.